United States Patent [19]

Martin

[11] 4,183,271
[45] Jan. 15, 1980

[54] ROTARY WEB SHEARING MACHINE

[76] Inventor: Merrill D. Martin, #2 Mall Ct., Oakland, Calif. 94611

[21] Appl. No.: 892,430

[22] Filed: Mar. 31, 1978

[51] Int. Cl.² ............................................. B23D 25/12
[52] U.S. Cl. ........................................ 83/156; 83/175; 83/295; 83/324; 83/369
[58] Field of Search .................... 83/76, 156, 286, 295, 83/324, 369, 175, 72

[56] References Cited

U.S. PATENT DOCUMENTS

| | | | |
|---|---|---|---|
| 1,994,107 | 3/1935 | MacFaren | 83/76 |
| 3,272,043 | 9/1966 | Ryan | 83/286 X |
| 3,411,388 | 11/1968 | Rappaport | 83/76 |
| 3,614,572 | 10/1971 | Usher | 83/295 X |

*Primary Examiner*—J. M. Meister
*Attorney, Agent, or Firm*—George B. White

[57] ABSTRACT

A rotary shear machine is described having a plurality of oppositely rotating hollow cylinder pairs carrying helical blades for transversely shearing several continuously moving webs perpendicular to their directions of travel. Each cylinder pair includes a separate reversible DC motor drive and an electronic digital control system regulating the motor drive for cutting sheets of predetermined lengths from the respective webs. A unique feature of the machine is a web feed and pull roller system having an independent drive for engaging and feeding the continuously moving webs into the respective helical blade shears and pulling sheets from the respective shears as they are cut from the continuously moving webs. The upstream feed roller system includes means for sensing web velocity and generating electronic pulses for input into the control means regulating the respective reversible DC motor drives driving the respective helical blade shears. The feed roller system further includes means for continuously generating electronic pulses even though the velocity sensing component is not in contact with the moving web. The proximity of the web velocity sensing means to the helical blade shears enables the helical blades to sever sheets from the respective webs with a high degree of precision and uniformity.

14 Claims, 16 Drawing Figures

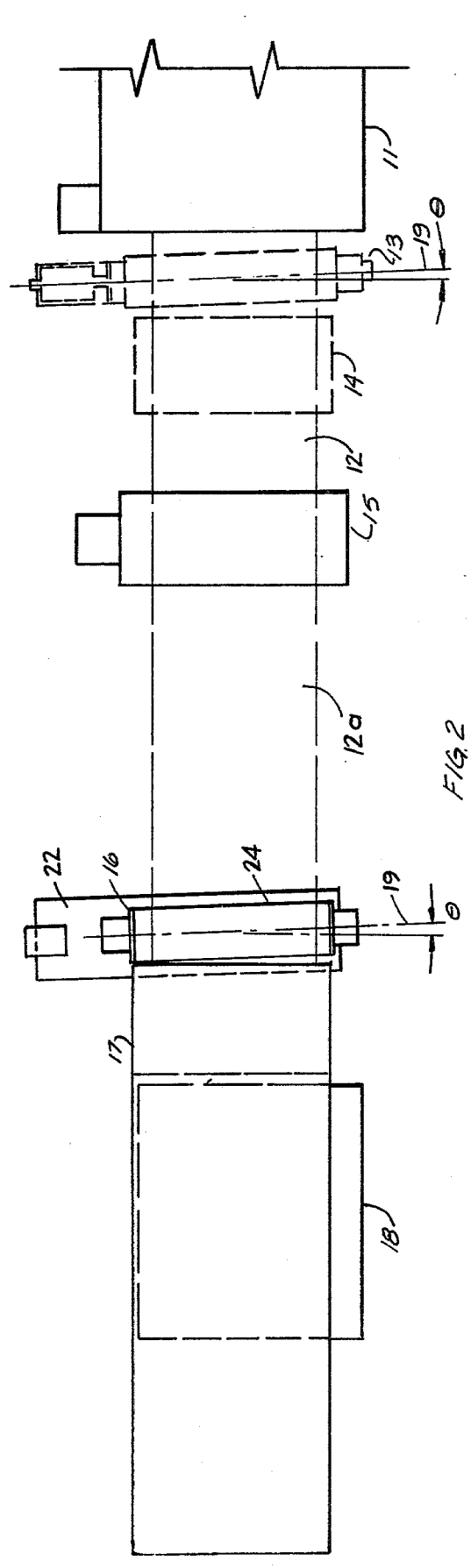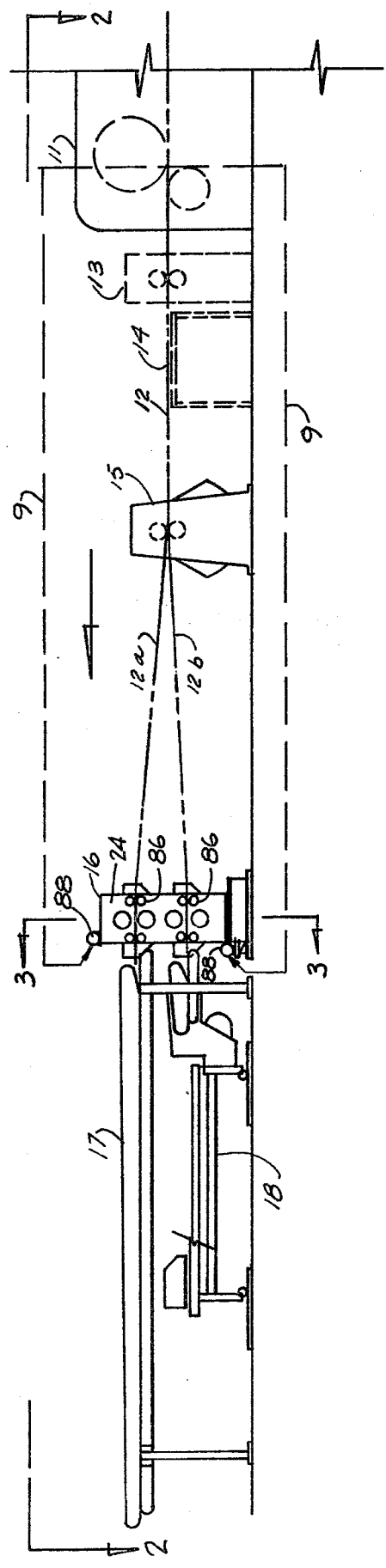

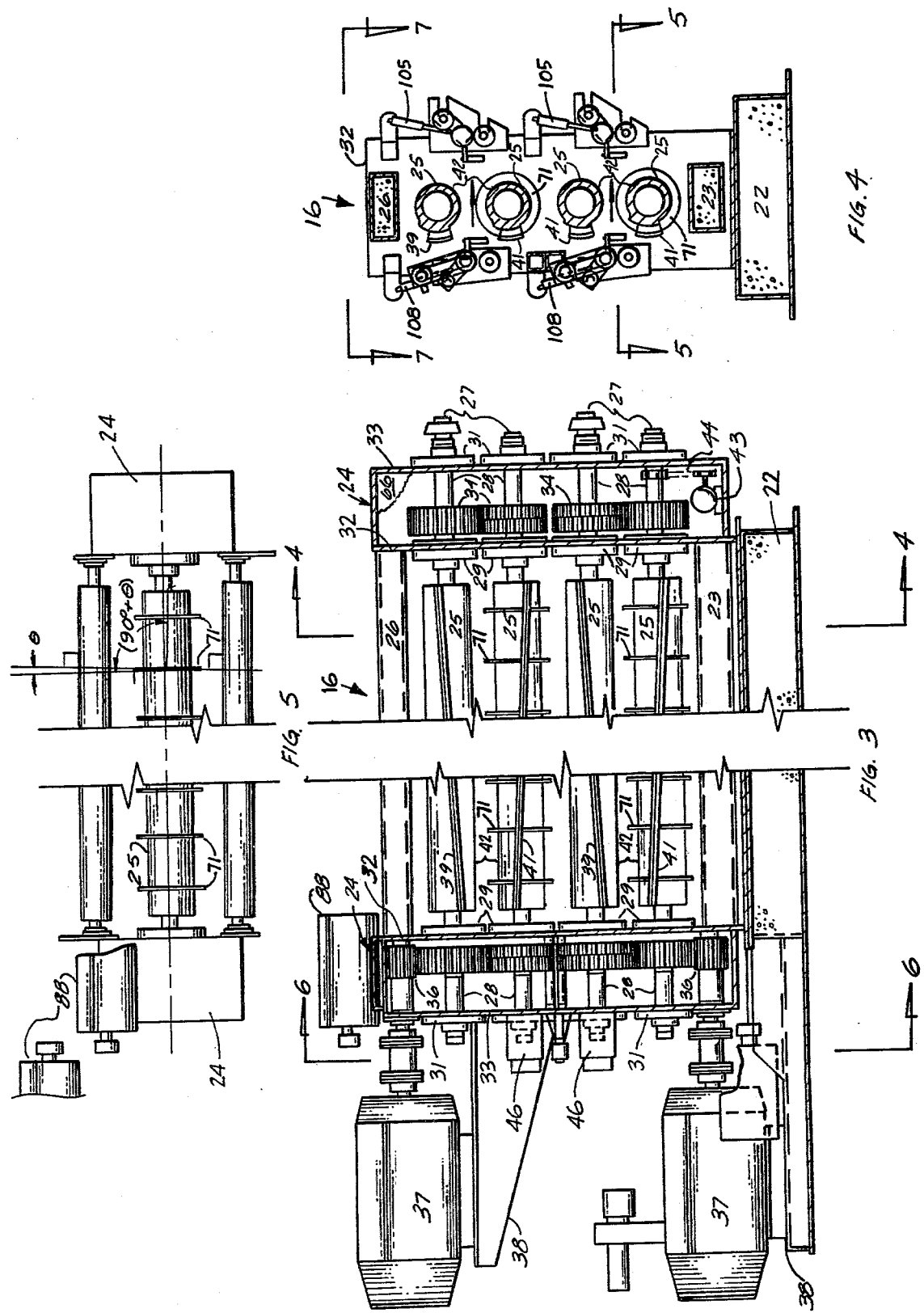

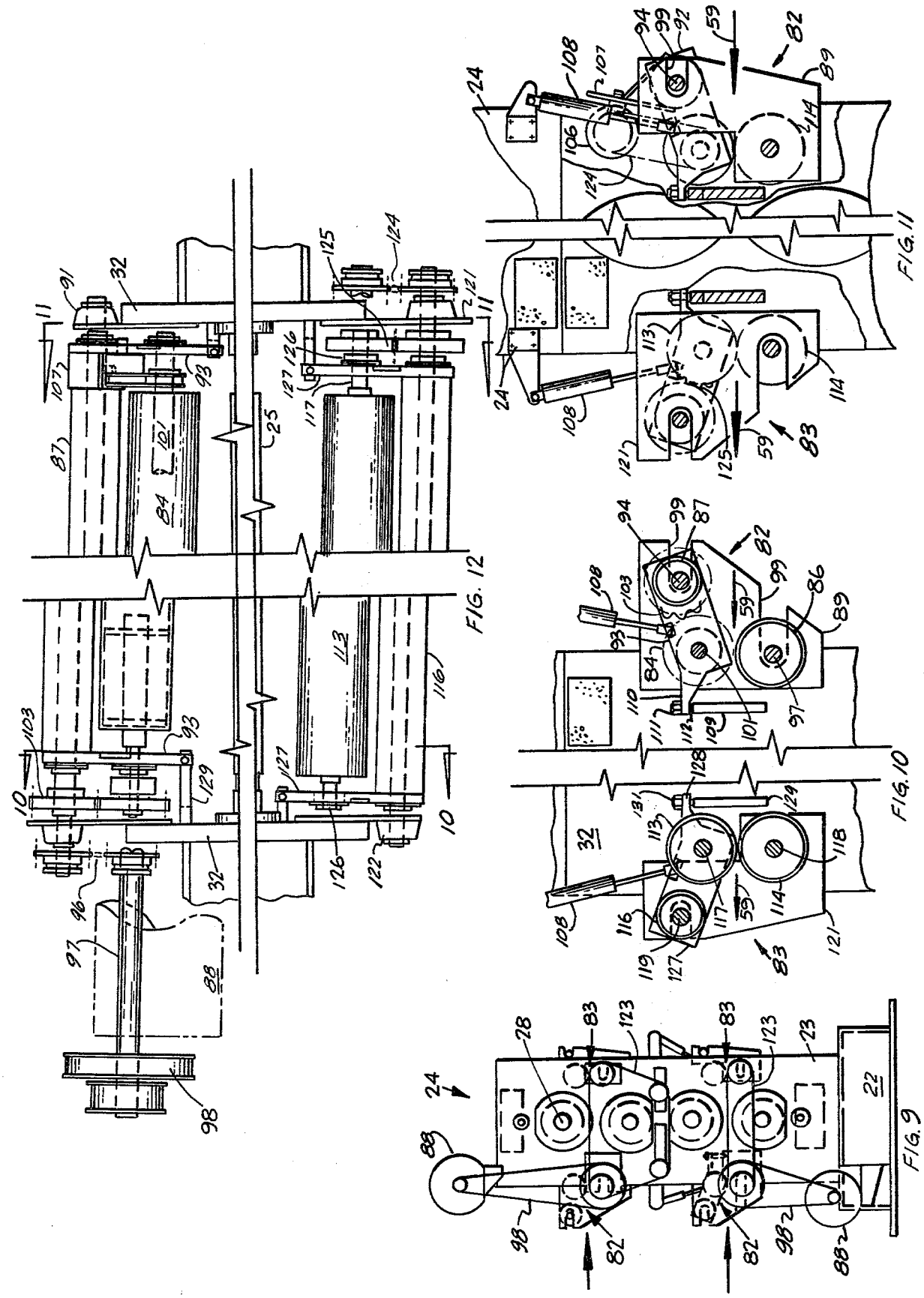

ROTARY WEB SHEARING MACHINE

BACKGROUND OF THE INVENTION

Corrugated paperboard is discharged from a corrugator machine as a continuous web which normally travels at substantial velocities. As a web travels, it is operated on by various machines for conversion into articles of manufacture such as corrugated cartons and the like. One such machine operating on the web is a slitting and scoring machine which severs the moving web from the corrugator lengthwise as well as scoring the web lengthwise. The respective webs exiting from the slitting and scoring machine then must be severed into sheets or blanks.

The lengths of the sheets severed from one web may be different from that of sheets severed from the other webs. Accordingly, one or more cutters must be utilized. Typically, rotary cutters or shears are used to sever the traveling paperboard webs more or less perpendicular to their directions of travel for production of sheets or blanks. In sheet production, it is desirable that the web be severed as near perpendicular to its direction of travel as possible. Also, in sheet production, it is desirable to control the rotary cutter such that sheet length is determined with a high degree of precision and with essentially no variance between different sheets.

There are basically two types of rotary shears and cutters, straight knife cutters and helical knife cutters.

The principal disadvantages of the existing straight knife rotary shear and cutter machinery are as follows:

(1) Straight knives are used for severing the web and consequently the entire web must be severed in a single simultaneous cut across its entire width;

(2) Straight knives require extremely massive carrier shafts or knife bars to withstand the impulse load of a single simultaneous cut across the entire web width;

(3) Existing rotary shears/cutters require complex mechanical drives and transmissions for cyclically driving the massive knife shafts which must be capable of withstanding the considerable stresses experienced in so driving such massive knife shafts;

(4) The mechanical drives and transmissions must include mechanical means for adjusting the cyclic rotation period of the knife shafts to allow production of sheets or blanks of different lengths;

(5) The range of sheet lengths which can be cut without decreasing web velocity is limited;

(6) Existing rotary shears/cutters are inertially limited to operate at low web velocities because of the massive components (transmissions and knife shafts).

For additional discussion of other problems and disadvantages of conventional straight knife mechanically controlled rotary shears/cutters, see U.S. Pat. Nos. 3,748,865 (R. C. Johnson) and 3,003,380 (H. W. Moser), each describing very complex mechanical means for delivering power to the rotating knife shafts and controlling the cyclic rotation period of such shafts.

Other serious disadvantages of existing straight knife rotary shear/cutter machines relate to their short lifetime, i.e., the mechanical vulnerability of component parts. Such mechanical vulnerability is primarily due to the massive nature of the components, cyclic loading of the gear train, and the impact loading experienced by the components upon each cut or shear. On the average, a conventional straight knife rotary shear/cutter must have one or another of its major components repaired or replaced each year. Specific components which are prone to mechanical failure are the transmission drives with sliding cranks and the like. Counterbalanced cut-off drives, while eliminating many of the problems inherent in sliding crank cut-off drives, introduce additional mass to the drive assembly which must be rotationally driven, thus creating inertial limitations on the operation and control of such machines. A good discussion of the problems encountered in producing and controlling sheet length cut by conventional straight knife rotary cutters is presented in U.S. Pat. No. 4,034,635 (A. B. Woolston).

Finally, conventional straight knife rotary shears/cutters for severing two webs exiting from a slitter/scorer machine typically have an extremely massive frame occupying considerable floor space.

The principal disadvantage of rotary shears/cutters carrying helical blades are as follows:

(1) Existing helical knife rotary shears/cutters do not sever the web perpendicular to its direction of travel;

(2) It is difficult to maintain proper alignment of the helical blades for progressively shearing material along their entire lengths;

(3) When driven by mechanical drives and transmissions, such must include mechanical means for adjusting the cyclic rotation period of the knife shafts to allow production of sheets or blanks of different lengths;

(4) When driven by independent drives, there is difficulty in obtaining uniform sheet lengths; and (5) Existing systems are inertially limited to operate at relatively low velocities because of their massive components (transmissions and knife shafts).

For a discussion of rotary shears/cutters carrying helical blades, see U.S. Pat. Nos. 3,570,348 (K. W. Hallden), 1,318,892 (M. Maier), and 2,942,534 (C. A. Boddy).

Consistent production of sheets of the same length with either straight knife or helical knife rotary shears/cutters is desirable but extremely difficult to obtain. Specifically, the web does not move at a constant velocity but rather at a variable velocity in part dependent upon the velocity at which the corrugator unit produces the paperboard web, in part dependent on other components operating on the web and in part dependent on the physical properties of the type of web material being produced.

In mechanical drive systems following the corrugator drive, the inertia of the drive components preclude accurate sheet length control. Moreover, in mechanical systems which incorporate several mechanisms for implementing corrections in sheet length control after error has been detected, the servo response systems typically have long time constants related to the expected linear velocity of the web material being severed successively (see U.S. Pat. No. 4,034,635 [A. B. Woolston]). Because of the inability to obtain precise sheet length control with mechanically linked drive systems for rotary shears, various electronically controlled independent direct drive rotary shears/cutters have been developed.

The essential components of such a direct drive system include a reversible drive capable of accelerating and decelerating rotation of the knife shafts, an electronic means for generating electronic pulses bearing a predetermined relationship to the velocity of the web prior to its being severed, an electronic means for generating electronic pulses bearing a predetermined relationship to the angular position and velocity of the shafts carrying the knives, a cut completion sensor for generating an electronic pulse signal indicating completion of a cut, and typically, a digital logic control system comparing the electronic signals received from said sensors for regulating the reversible drive. For a description of an existing digital logic control system for regulating direct drive rotary shears/cutters for sheet production, see U.S. Pat. No. 4,020,406 (Tokuno, et al., Col. 7, 1. 45–Col. 10, 1.5).

The weaknesses of existing direct drive rotary shears/cutters relate primarily to the components sensing web velocity. In particular, it is extremely difficult to accurately sense web velocity at one point in a web and generate electronic pulses corresponding thereto as a function of time and correlate it to the velocity at which the web is moving to the point it is to be severed. This problem is particularly acute since the knives, whether helical or straight, carried by the rotating shafts must be moving at the velocity of the web at the point they engage the web throughout the period of the cut, i.e., until they rotate out of the path of the web. For example, if the blades are traveling at a velocity greater than that of the web, a sheet may be torn from the web rather than severed from the web. Conversely, if the blades are moving slower than the web through the period of cut, then the web upstream will buckle against the blades during the period of cut. Accordingly, the next sheet cut will have a greater length than the sheet previously cut.

Another serious drawback in existing digitally controlled direct drive rotary shears/cutters relates to spurious electronic pulse generation in the control electronics. Spurious pulses result from switching from one control circuit to another and like phenomenon. Such spurious electronic pulses can cause the digital control system to operate out of a synchronism with the web velocity, thus precluding accurate sheet length control.

Finally, most other machinery units necessary for manufacturing paperboard have capacities to operate at much higher web velocities than existing rotary shears/cutters. In fact, it is often necessary, because of the mechanical vulnerability of existing rotary shears/cutters, to operate machinery both up and downstream from the cutter to less than half their operational capacity. However, for economical operation, the machinery manufacturing corrugated paperboard must operate at or near full capacity. Accordingly, any component of the machinery system operating on the paperboard web which limits the velocity of the web to less than the velocity at which the corrugator produces the web is detrimental.

SUMMARY OF THE INVENTION

A direct drive rotary shear machine is described capable of severing a plurality of continuously moving webs of paperboard. Each web is severed by a pair of helical shear blades secured to oppositely rotating hollow cylinders. The axes of rotation of the oppositely rotating hollow cylinder pairs are inclined off square to the direction of travel of the moving webs at an angle equal to the blade helix angle such that when the helical blades sever the web, the web is severed perpendicular to its direction of travel. The invented rotary shear machine includes a reversible direct current (DC) electrical motor directly driving each oppositely rotating hollow cylinder pair. The oppositely rotating cylinders are coupled by antibacklash gearing per my teachings in U.S. Pat. No. 3,037,396, for maintaining precise shearing engagement of the helical blades carried by the oppositely rotating hollow cylinder pairs and for minimizing torsional flexure both of the rotating hollow cylinders and the frame structure supporting the cylinders. The helical configuration of the blades or knives minimizes loading on the shafts carrying the oppositely rotating cylinder pairs in that the traveling web is severed gradually and progressively as the hollow blade cylinders rotate.

A particular advantage of the described rotary shear is its rigidity which is provided by a loop frame structure supporting the hollow cylinder helical blade shears formed by coupled cantilever bearing support frames at the respective ends of the shafts carrying the oppositely rotating hollow cylinder pairs and concrete filled cross frame and base members. The coupled external cantilever support bearing frame minimizes bending flexure of the oppositely rotating cylinders while the concrete filled frame and base members minimize bending flexure of the frame structure. The concrete filled frame and base members also damp mechanical vibrations and minimize effects of thermal stresses.

A particularly novel feature of the invented rotary shear machine is the feed and pull roller system for each hollow cylinder shear which feeds the continuous web into the hollow cylinder helical blade shears and pulls severed blanks from the respective shears. A common drive follower means rotatably drives the pull and feed rollers for each hollow cylinder pair at a circumferencial velocity equal to the web velocity responsive to either an electrical or pneumatic signal generated by an upstream component of the machinery system engaging and driving the web prior to its being severed into a plurality of separate moving webs.

A unique feature of the feed roller system is that one of the feed rollers also serves as a web velocity sensor and is coupled to a pulse generator for generating electronic pulses bearing a predetermined relationship to the length and linear velocity of the continuous web fed into the helical blade shears. The web velocity sensing feed roller is not driven by the common drive follower drive means when the feed roller is in contact with the moving web. However, a clutch means engages the web velocity sensing feed roller with the common drive follower means when said feed roller is not in contact with the moving web. The electronic pulses form the pulse generator are input into a digital logic electronic control system regulating a particular DC electrical motor drive driving the particular helical blade shear.

The advantage of the described feed and pull roller system is that the linear velocity of the web is essentially stabilized as it moves through a particular helical blade shear thus providing a very precise relationship between the electronic pulses generated by the pulse generator coupled to the web sensing feed roller and the linear velocity of the web such that the digital logic control system is able to regulate the drive means driving a particular helical blade shear for severing sheets having very precise and uniform lengths from the web. Specifically, the web feed and pull rollers establish and maintain a very precise velocity distance relationship between the point where the velocity of the web is sensed and the point where the web is severed. Further, continuous electronic pulse generation is provided by the clutch means coupling the web feed sensing roller to the driving means when the sensing roller is moved out of contact with the web. Accordingly, the control system can be used for regulating the respective DC motor driving the hollow cylinder helical blade shears for purposes other than sheet production, e.g. removal of sample sheets and/or web sections which do not meet production criteria from the web.

The unique mechanical features of the described rotary shear machine, i.e., the plurality of hollow cylinder helical blade shears, the rigidity and stability provided to the respective oppositely rotating hollow cylinder pairs of the shears by the unitary loop frame structure including the externally coupled cantilever support bearing frames and concrete filled structural cross frame members, and the antibacklash gearing for driving the oppositely rotating hollow cylinders, combine to significantly reduce the mass and therefore inertia of the rotating components of the machine over that of existing rotary shear and cutter machines. Further, the common cantilever bearing support frame supporting the respective ends of the hollow cylinder pairs also serves as a common container for containing a lubricant for lubricating the antibacklash gearing coupling the respective hollow cylinder pairs. It is the reduction of mass, ergo inertia, which enables the rotational period of the respective hollow cylinder helical blade shears to be regulated by controlling the reversible DC electrical motor drive. Also, the reduction in the inertial mass makes rotary shearing operations possible at web velocities up to 1,000 f.p.m. (5.08 meters per second).

Finally, other objects, advantages and novel features of the invented rotary shear machine for severing a plurality of webs will become apparent upon examination of the following detailed description of preferred embodiments of the machine, together with the accompanying figures.

DESCRIPTION OF THE FIGURES

FIG. 1 is a schematic side elevation plan view of machinery components for manufacturing paperboard blanks from the corrugator machine to the stacker machinery.

FIG. 2 is a schematic top elevation view of the machinery components shown in FIG. 1.

FIG. 3 is a side elevation view of the invented rotary shear machine illustrating the essential structural components of the machine.

FIG. 4 is a cross-sectional view of the rotary shear machine taken along Line 4—4 of FIG. 3.

FIG. 5 is a cross-sectional view of the rotary shear machine taken along Line 5—5 of FIG. 4.

FIG. 9 is an end elevation view of the rotary shear machine illustrating the drive pulley system for rotating the web feed and web pull roller systems, respectively.

FIGS. 10 and 11 are enlarged cross-sectional views showing details of the supporting structures for the web feed and web pull roller systems.

FIG. 12 is a top elevation view of the feed and pull roller systems for each shear.

DETAILED DESCRIPTION OF A PREFERRED EMBODIMENT

Figure 6:
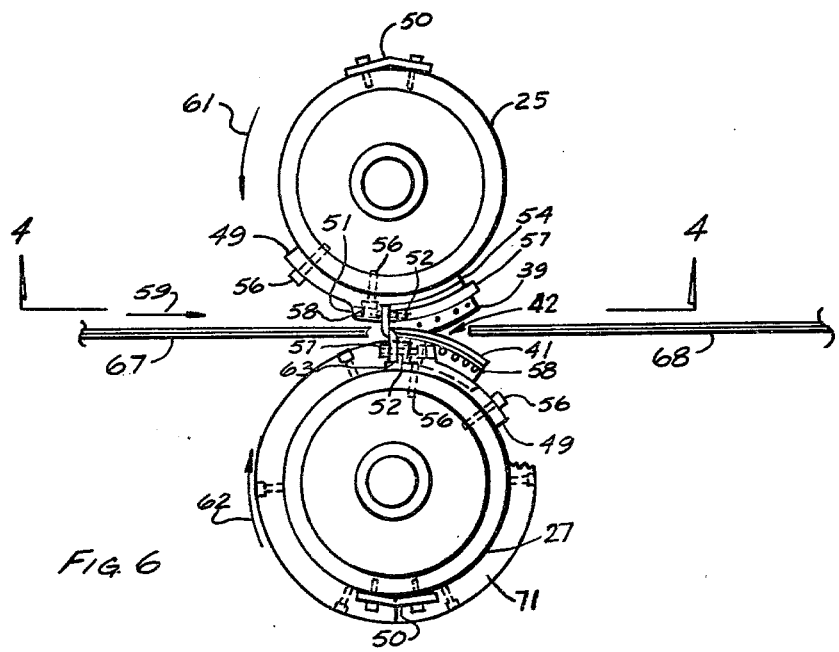
FIG. 6 is a partial cross-sectional view taken along Line 4—4 of FIG. 3 illustrating the shearing engagement of the helical blades.

FIGS. 1 and 2 schematically show the relationship between the respective machinery components of a system for manufacturing corrugated paperboard blanks, from the corrugator machinery to the stacker machinery. Specifically, beginning at the right hand side of FIGS. 1 and 2, there is a corrugator machine 11 for continuously producing a corrugated paperboard web 12, and an intermittent shear machine 13 for severing the web 12 at will, enabling excision of poor quality sections of the web and/or enabling order changes downstream. The next element is a diverting table 14 for diverting excised portions of the web 12 from the typical web processing path, a slitting and scoring machine 15 for separating the webs lengthwise into a plurality of separate webs 12a and 12b, and the multiple rotary shear machine 16 for severing blanks perpendicularly with respect to the direction of web travel into sheets from the respective webs 12a and 12b. Finally, there is an upper stacker 17 and a lower stacker 18 for stacking the sheets severed from the respective webs 12a and 12b into vertical piles.

As shown, both the intermittent shear 13 and the invented multiple rotary shear machines carry helical shear blades on cylinders the rotational axes 19 of which are each inclined at an angle of ¼, the blade helix angle, off of square with respect to the direction of web travel such that the respective webs are severed perpendicularly with respect to their directions of travel.

A. STRUCTURE OF THE MULTIPLE WEB ROTARY SHEAR MACHINE

FIGS. 3 and 4 illustrate the structure and components of the invented rotary shear machine, including a concrete filled base frame member 22, concrete filled lower cross-brace members 23, two box bearing frame structures 24, and upper concrete filled cross-brace members 26. The bearing frames 24 and the upper and lower cross-brace members, 23 and 26, define and provide a rigid loop frame support. Parallel hollow cylinders 25 are supported within the loop frame by shafts 28 extending from the respective ends of the cylinders in pairs 27. Each extending shaft 28 is received by two bearings 29 and 31 secured to an inside bearing plate 32 and an outside bearing plate 33, respectively, of the box bearing support frames 24. It should be noted that the shafts 28 extend completely through the box bearing frames 24.

Antibacklash transmission gearing 34 couples the shafts 28 extending from the respective ends of each pair of hollow cylinders 27 between the inside and outside bearings 29 and 31 within the box bearing frame structures 24. For a detailed description of the antibacklash transmission gearing 34, please refer to my teachings appearing in U.S. Pat. No. 3,037,396. The antibacklash gearing 34 coupling the shafts 28 balances opposing torsional forces experienced by the hollow cylinders 25 and torsional forces experienced by the structural frame members supporting the hollow cylinders 25 upon acceleration and deceleration of rotation of the cylinders 25. It should be noted that the antibacklash transmission gearing 34 also couples the shafts 28 such that the hollow cylinders 25 of each pair are rotated in opposite directions.

Each antibacklash transmission gearing 34 is coupled directly to a reversible DC electrical motor 37 mounted at one end of the rotary shear machine, by a driving gear 36. The reversible DC electrical motors 37 are mounted respectively on a platform 38 suitably secured to the outside bearing plate 33 and on the base 22 of the bearing frame structure 24.

As discussed in greater detail infra, the DC electrical motors 37 are utilized to accelerate and decelerate rotation of the oppositely rotating hollow cylinders 25, to thus eliminate the necessity for brakes, cyclically variable mechanical transmission devices and/or clutch mechanisms for varying the rotational period of the cylinders 25.

Cutting blades 39 and 41 are secured helically across the cylindrical surface of the upper and lower cylinders 25 of each cylinder pair. The cutting blade 39 secured helically across the upper cylinder 25 is inclined at an angle $\theta$ with respect to the longitudinal rotational axis of the upper cylinder 25 while the cutting blade 41 secured helically across the cylindrical surface of the lower cylinder 25 is inclined at an angle of $(360° - \theta)$ with respect to the longitudinal axis of the lower cylinder 25, $\theta$ being defined as the blade helix angle.

The cutting blades 39 and 41 are secured relative to each other on the respective surfaces of each pair of cylinders 25 in such a rotational position that the blades progressively engage in shearing contact as the cylinders 25 oppositely rotate (see FIG. 6). Web material, such as corrugated paperboard, is threaded through the space 42 between the hollow cylinders 25 of each pair.

Selection of the proper blade helix angle $\theta$ is primarily dependent upon the following factors:

(1) The range of expected shear resistance of the materials to be cut;
(2) The length of the cylinders carrying the blades (maximum web width);
(3) The circumference of the cylinders carrying the blades;
(4) The load carrying capabilities of the cylinder shaft 28, bearings 29 and 31, and the box bearing support frames 24; and
(5) The operational capabilities of the reversible DC motor rotating the particular pair of hollow cylinders.

For conventional corrugated paperboard webs having widths ranging up to 3 meters (120 inches), blade helix angles ranging between 0.5° and 3° have been found suitable. The axial lengths of the blade helixes should be at least equal to the width of the moving web to be severed.

Viewing FIG. 3, the paperboard webs would be moving into the drawing. Accordingly, upon opposite rotation of the cylinders 25 of the respective pairs, the cutting blades 39 and 41 progressively engage in shearing contact across their entire lengths, beginning at the left hand side of the machine 21 to completely sever or shear any web material moving in the space 42 between the respective pair of cylinders 25.

The box bearing frame structures 24 being complete enclosures also function as a container for bathing the antibacklash transmission gearing 34 in oil (not shown). In fact, oil pumps 43 may be mounted in the base of the box bearing frame structures 24 for spraying oil on the respective transmission gearings 34. The oil pumps 43 could be driven by a suitable chain drive unit 44 coupled to the shafts 28 of the lowest cylinder 25.

Figure 7:
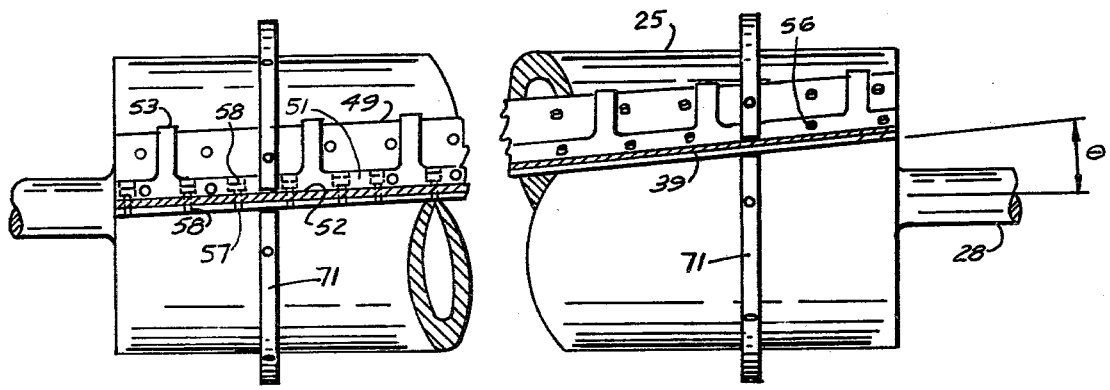
FIG. 7 is a side elevation view of one of the hollow cylinders showing details of securing a blade helically to its cylindrical surface.

Now, referring to FIGS. 6 and 7, the cutting blades 39 and 41 are secured helically across the cylindrical surface of the cylinders 25 forming each pair 27 by blade holding assemblies 49. Each blade holding assembly 49 includes a shoulder 51 defining a radial face 52 with spirals helically relative to the surface of the cylinder 25 to which it is secured at a helix angle $\theta$, or $(360° - \theta)$, depending upon whether the assembly 49 is secured to the upper or lower cylinder 25 of the pair. The radial face 52 of the assembly 49 supports the back of the cutting blades 39 and 41. Additional reinforcement for holding the cutting blades 39 and 41 at the precise helix angles is provided by reinforcing ribs 53 integral with the shoulder 51 at intervals along the length of the assembly 49. The assembly 49 further includes an integral platform 54 for supporting the base of the cutting blades 39 and 41. The blade holding assemblies 49 are secured to the surface of the cylinders 25 by appropriate bolt means 56. The cutting blades 39 and 41 are secured between the radial face 52 of the shoulders 51 and clamp bars 57 by a plurality of bolts 58.

The blade holding assemblies 49 may be formed by a single integral piece helically winding around the cylindrical surface of the respective cylinders as illustrated in FIG. 7. For balancing rotation of the cylinders 25, counter balances 50 are secured to the surface of the cylinders diametrically opposite of the blades 39 and 41 on the respective upper and lower cylinders 25 of each pair.

FIG. 6 illustrates the shearing engagement of the cutting blades 39 and 41 across their respective faces. The lower cutting blade 41 rotationally precedes the upper cutting blade 39. As shown in FIG. 6, the faces of the cutting blades 39 and 41 are vertically aligned. In order to prevent the cutting edge of the upper blade 39 from engaging and scraping against the face of the lower blade 41 as they rotate out of engagement, the lower blade (which rotationally precedes the upper blade) is given a slightly greater radius of rotation than the upper blade 39. In the embodiment shown in FIG. 6, the cutting blade 41 is provided a slightly greater rotational radius than the cutting blade 39 by placing a shim 63 between the base of the blade 41 and the platform 54 of the blade holding assembly 49.

Figure 8:
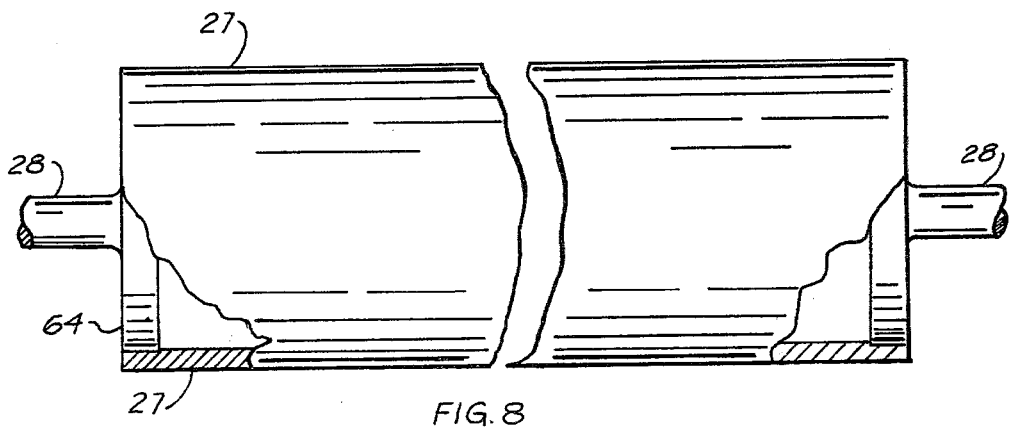
FIG. 8 is a cross-sectional view of one of the hollow blade carrying cylinders and its supporting shafts.

Referring now to FIG. 8, the shafts 28 each include an integral raised annular shoulder 64 which is received in the interiors of the hollow cylinders 25 forming the hollow cylinder pairs 27. The raised annular shoulders 64 are appropriately secured to the interior walls of the respective hollow cylinders 25 by welding and/or bolts.

Referring back to FIG. 3, the box bearing support frames 24 each include an inner bearing support plate 32 and an outer bearing support plate 33 and rigid side plates 66 holding the inner and outer bearing support plates 32 and 33 in rigid space relationship. The shafts 28 carrying the hollow cylinders 25 extend completely through the box bearing support frames 24. Accordingly, the box bearing support frames 24 provide counterbalancing coupled cantilever supports stiffening the shafts 28 and the cylinders 25 against flexure as they rotate.

In particular, as the helical blades 39 and 41 carried by the hollow cylinders 25 shear the respective webs 12 threading therebetween, forces are generated which tend to bend or flex the cylinders 25 and shafts 28 apart. The flexure of the cylinders 25 and shafts 28 include both vertical and horizontal components. Also, the flexure of the cylinders 25 of the hollow cylinder pairs 27 and their respective shafts 28 are oppositely directed. If such flexure is permitted, good shearing engagement of the helical blades 39 and 41 carried by the respective cylinders 25 cannot be maintained throughout the cut. To prevent such flexure, the outside bearing plates 33 and bearings 31 of the bearing frame structure provide external cantilever support to the respective cylinders 25 and shafts 28, stiffening them against flexure in any plane. Specifically, the inner bearing plates 32 and inner bearings 29 provide fulcrum upon which the cylinders 25 and the portion of the shafts 28 inside of the bearings 29 on the one hand, and the portion of the shafts 28 outside the bearings 29 on the other hand, must pivot. The outside bearings 31 and the outside bearing plates 33 rigidly constrain or prevent movement of the shafts 28 extending beyond the inner bearing plates 29, hence, preventing movement of the shafts 28 and cylinders 25 inside the bearing plates 29. Since the inside and the outside bearing plates 32 and 33 of the bearing frame structure 24 are common for both the upper and lower shafts 28, the forces tending to flex the pairs of cylinders 25 and their shaft 28 apart are mechanically counterbalanced. For example, any force tending to flex the lower cylinder 25 would include a force acting on the ends of the particular shafts 28 extending beyond the inner bearings 29 which, in turn, induces a counterbalancing force, tending to flex the upper cylinder 25 in the same direction in the region between the inner bearings 29. However, since any force tending to flex the lower cylinder would always have its equal and opposite force counterpart acting on the upper cylinder, the respective forces transmitted by the external (cantilever) bearings 31 simply cancel (counterbalance) the forces tending to flex the upper and lower pair of cylinders apart. In fact, it is even possible to prestrain the cylinders and shafts 25 and 28 of each pair against anticipated bending flexure by mounting the inner and outer bearings 29 and 31 carrying the same slightly out of coaxial alignment.

The concrete filled structural frame members completing the loop frame, i.e., the base 22, the lower cross-brace 23 and the upper cross-brace 26, coact with the box bearing support frames to enhance their rigidity. Specifically, as previously discussed, the box bearing frame structures 24 each form a rigid structural box. The concrete filled structural frame members resist forces tending to skew the box bearing support frames out of square with each other. In addition, the box bearing support structures 24 being composed of structural metal, react elastically within a certain range, and cyclic stresses would establish elastic vibrations in the box bearing frame structures. The concrete filled brace members 22, 23 and 26 forming the sides of the loop frame structure effectively isolate the vibrations of the respective box frame structures 24 at each end of the loop frame from the other.

Referring now to FIG. 2, to shear the moving web of material 12 perpendicularly with respect to its direction of travel, the axes of rotation of the respective hollow cylinders 25 must be inclined off square from the direction of web travel 59 at an angle equal to the blade helix angle $\theta$. In particular, referring to FIG. 5, the rotational axes of the respective cylinders 25 carrying the helical blades 39 and 41 are inclined at an angle $\theta$ off square with the direction of travel 59 of the web 12. When so inclined, the rotary shear machine cuts sheets 68 perpendicularly from the webs 12 threading between the respective pairs of hollow cylinders 25. A feed and pull roller system, described in greater detail infra, maintains the angular relationship between the respective traveling webs 12a and 12b and the rotational axes 19 of the pairs of parallel hollow cylinders 25.

For perpendicular cuts, the minimal axial length "L" of the blade is given by the formula: $L = W \csc \theta$, where $\theta$ is the blade helix angle and "W" is the maximum width of a web which can be severed by a particular hollow cylinder pair 27 of the rotary shear machine.

B. Description of Structure and Operation of the Web Feed and Pull Roller Systems Now referring to FIGS. 9 through 13, the described rotary shear machine includes a web feed roller system 82 and a web pull roller system 83 for each pair helical blade cylinders 25. The web feed roller system 82 is located immediately upstream from the respective helical blade cylinders 25 and feeds the continuously moving web 67 between the cylinders 25. The web pull roller system 83 is located immediately downstream from the respective pair of helical blade cylinders 25 and pulls the web past the locus at which the web is severed.

The web feed roller system 82 includes an upper feed roller 84, a lower feed roller 86, a pivot bar 87, each supported respectively by a central shaft, 101, 97 and 94. The shaft 94 of pivot bar 87 and the shaft 97 of lower feed roller 86 are received and supported by bearings 91 mounted in frame supports 89 which are in turn secured to the inside bearing plates 32 of the box bearing frame structures 24. The shaft 101 of upper feed roller 84 is received and supported by bearings 92 mounted in support arms 93 integral with the pivot bar 87. The shaft 94 of the pivot bar 87 is coupled to the shaft 97 of the lower feed roller 86 by a conventional belt pulley coupling 96. The shaft 97 supporting the lower feed roller 86 is coupled to a DC electrical motor 88 through a conventional belt pulley arrangement 98. The bearings 91 through which the shafts 94 and 97 of the pivot bar 87 and lower feed roller 86 are supported respectively, are received and mounted in slots 99 of the frame supports to enable the axes of rotation of the upper and lower feed rollers 84 and 86 to be adjusted in a position perpendicular relative to the direction of web travel. Specifically, the axes of rotation of the web upper and lower feed rollers 84 and 86 to be adjusted in a position perpendicular relative to the direction of web travel. Specifically, the axes of rotation of the web upper and lower feed rollers 84 and 86 are not oriented parallel to the axes of rotation of the helical blade cylinders 25 but rather are oriented at the blade helix angle $\theta$ relative to the axes of rotation of the helical blade cylinders 25.

Figure 13:
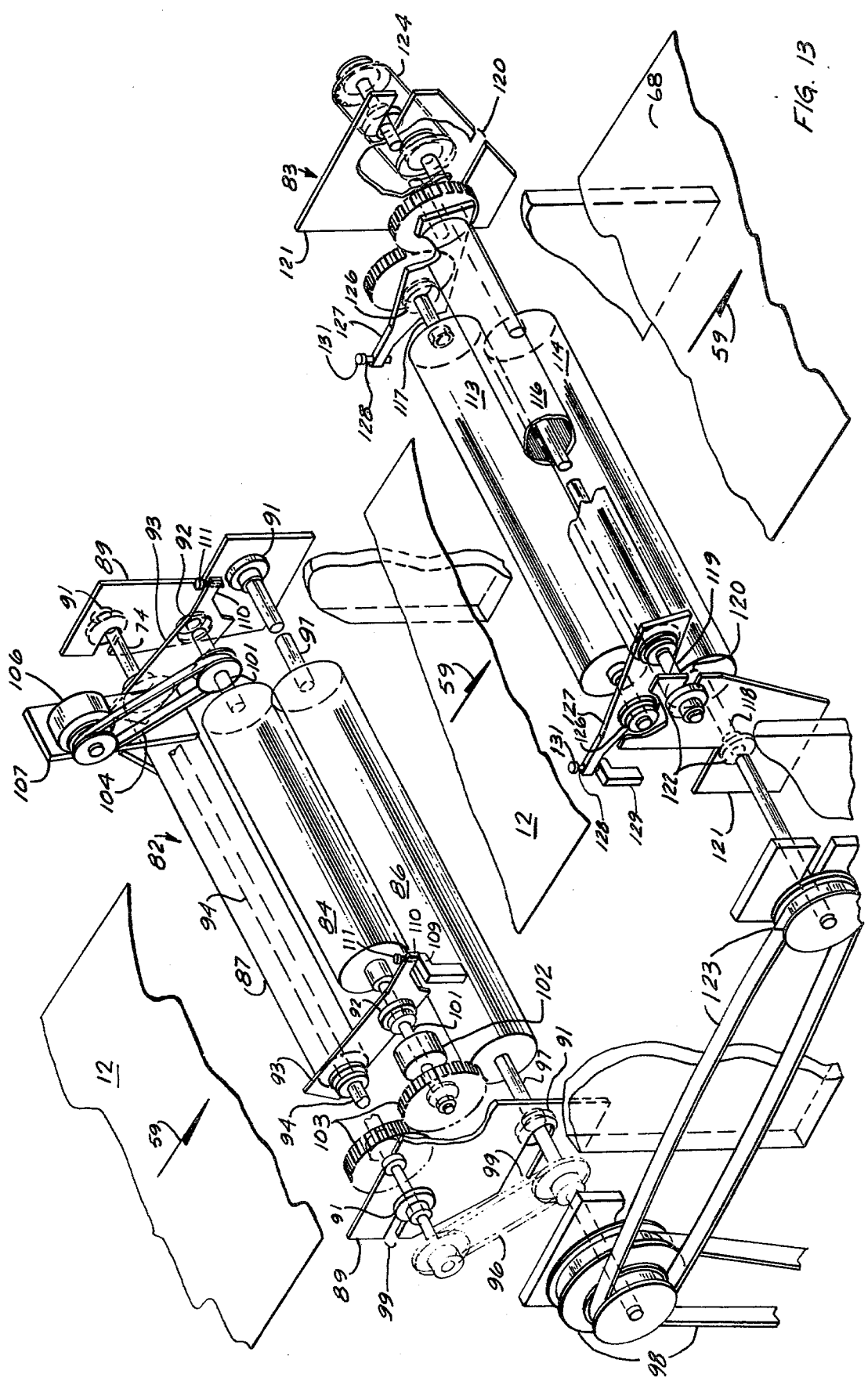
FIG. 13 is a diagrammatic perspective view of the feed and pull roller systems illustrating the essential components of the system.

One end of the shaft 101 supporting the upper feed roller 84 is coupled through a normally opened electromagnetic clutch mechanism 102 to a 1:1 transmission gearing 103. The transmission 103 in turn is coupled to the shaft 94 of the pivot bar 87. The 1:1 transmission gearing 103 also serves to reverse rotation such that when the clutch is engaged, the upper feed roller 84 is rotatably driven in a direction opposite that of the lower feed roller. The normally opened electromagnetic clutch mechanism 102, when energized, couples the shaft 101 supporting the upper feed roller 84 to the 1:1 transmission gearing 103 rotatably driven by the shaft 94 of the pivot bar 87. The upper feed roller 84 will only rotate responsive to frictional contact of the web moving between the upper feed roller 84 and the lower feed roller 86 when the upper feed roller is in lowered position as shown in FIG. 13.

The remaining end of the shaft 101 supporting the upper feed roller 84 is coupled by a conventional pulley belt arrangement 104 to an electronic pulse generator 106. The electronic pulse generator 106 is mounted on a frame structure 107 secured to the pivot bar 87.

Hydraulic or pneumatic cylinders 108 are coupled to the support arms 93 and the box bearing frame structure 24 for raising and lowering the upper feed roller 84 from and into contact with the moving web 12. The support arms 93 supporting the upper feed roller 84 also include integral extending fingers 110 which are adapted to contact a stop 109 secured to the inner bearing plates 32 of the box bearing support frames 24 to prevent the upper feed roller 84 from being lowered beyond a certain point. The fingers 110 include an adjustment bolt 111 such that the space between the upper feed roller 84 and the lower feed roller 86 can be adjusted for webs of different thickness.

One of the stops 109 also includes a limit switch 112 which energizes the electromagnetic clutch mechanism 102 when the upper feed roller 84 is in the raised position. Accordingly, when the upper feed roller 84 is in the lowered position, as shown in FIGS. 10 and 11, the limit switch 112 deenergizes the electromagnetic clutch 102 to decouple the upper feed roller 84 from the driven shaft 94 of the pivot bar 87. Accordingly, the upper feed roller 84 is rotatably driven by the web 12 and the pulse generator 106 thus generates electronic pulses bearing a predetermined relationship to the velocity at which the web 12 is moving. However, when the upper feed roller 84 is lifted out of contact with the web 12, the limit switch 112 is released, energizing the electromagnetic clutch 102 to couple the shaft 101 of the upper feed roller 84 to the shaft 94 of the pivot bar 87 so that the upper feed roller 84 is rotatably driven by the shaft 94 of the pivot bar 87.

Referring back to FIG. 1, the DC electrical motor drive 88 drives the lower feed rollers 86 responsive to electrical and/or pneumatic signals from an upstream component of the machinery system engaging and operating on the continuously moving web 12 such that the motors 88 drive the lower feed rollers 86 at a circumferential velocity equal to the velocity at which the web is moving. As schematically indicated by lines 9 in FIG. 1, the motors 88 drive the lower feed rollers 86 responsive to electrical signals from the corrugator 11. Thus, there is no interruption of electronic pulses from the pulse generator 106 in the event the upper feed roller 84 is lifted out of contact with the moving web and the pulse generated remains in relative synchronization with web 12 velocity.

Referring back to FIGS. 9 through 13, the web-pull roller system 83 includes an upper pull roller 113, a lower pull roller 114 and a pivot bar 116, each supported by a central shaft, 117, 118 and 119, respectively, frame supports 121 secured to the inner bearing plates 32 of the box frame structures 24, and support bearings 122 for receiving the respective ends of the shafts 118 supporting the lower pull roller 114, and shaft 119 supporting the pivot bar 116. Specifically, the frame supports 121 have slots for receiving the bearings 122 such that the axes of rotation of the upper pull roller 113 and the lower pull roller 114 can be oriented perpendicularly with respect to the direction of web travel. Specifically, the axes of rotation of the upper and lower pull rollers 113 and 114 are aligned parallel with respect to the axes of rotation of the upper and lower feed rollers 84 and 86 and at the blade helix angle $\theta$ relative to the axes of rotation of the particular helical blade cylinders 25. The shaft 118 of the lower pull roller 114 is coupled by a conventional belt pulley arrangement 123 to the shaft 97 of the lower feed roller 86 at a 1:1 ratio. Accordingly, the lower feed roller 86 and the lower pull roller 114 rotate at the same angular velocity. The shaft 119 of the pivot bar 116 is coupled to the shaft 118 of the lower pull roller 114 by another conventional pulley belt coupling 124 at a 1:1 ratio. A 1:1 gear transmission 125 couples the pivot bar shaft 119 to the shaft 117 of the upper pull roller 113 such that the upper pull roller 113 is rotatably driven in an opposite direction as the lower pull roller 114 but at exactly the same angular velocity.

The ends of the shafts 117 extending from the upper pull roller 113 are received in bearings 126 mounted in support arms 127 which are integral with the pivot bar 116 such that the upper pull roller 113 can pivot about pivot bar shaft 119. Hydraulic and/or pneumatic cylinders 105 are secured between the support arms 127 supporting the upper pull roller 113 and the box bearing frame structures 24 for lifting and lowering the upper pull roller 113 from and into contact with the moving web 12. The support arms 127 further include integrally extending fingers 128 which engage a stop 129 mounted on the inner bearing plates 32, when the upper pull roller 113 is in the lowered position. The fingers 128 include an adjustment bolt 131 such that the space between the upper pull roller 113 and the lower pull roller 114 can be adjusted for receiving webs of different thickness.

The upper and lower pull rollers 113 and 114, and the upper and lower feed rollers 84 and 86, all have the same diameter. Accordingly, since the upper and lower pull rollers 113 and 114 are directly coupled through conventional belt pulley mechanisms to the direct current electrical motor drive 88, the latter rollers are rotatably driven such that their circumferential velocity also is equal to the velocity of the web as it feeds into the rotary shear machine. Accordingly, the upper and lower pull rollers essentially follow the web through the shear machine as a blank 68 is being severed from the web. The upper feed roller 84 follows the velocity of the web as it is fed and pulled through the shear machine by the web feed and pull roller systems 82 and 83. Thus, the electronic pulse generator 106 coupled to the shaft 101 of the upper feed roller generates electronic pulses at a rate bearing a very precise relationship to the velocity at which the web moves through the rotary shear machine. In more concise term, the web feed and pull roller systems 82 and 83 determine the velocity at which the web moves between the cylinders 25 carrying the helical blade shears.

The adjustment bolts 111 and 131 on the extending fingers 128 and 110 of the support arms 127 and 93 for the upper pull roller 113 and upper feed roller 84 should be adjusted such that when the upper feed and pull rollers 84 and 113 are in the lowered position, they slightly compress the web material 12 threading therebetween.

C. Operation and Control

Figure 14:
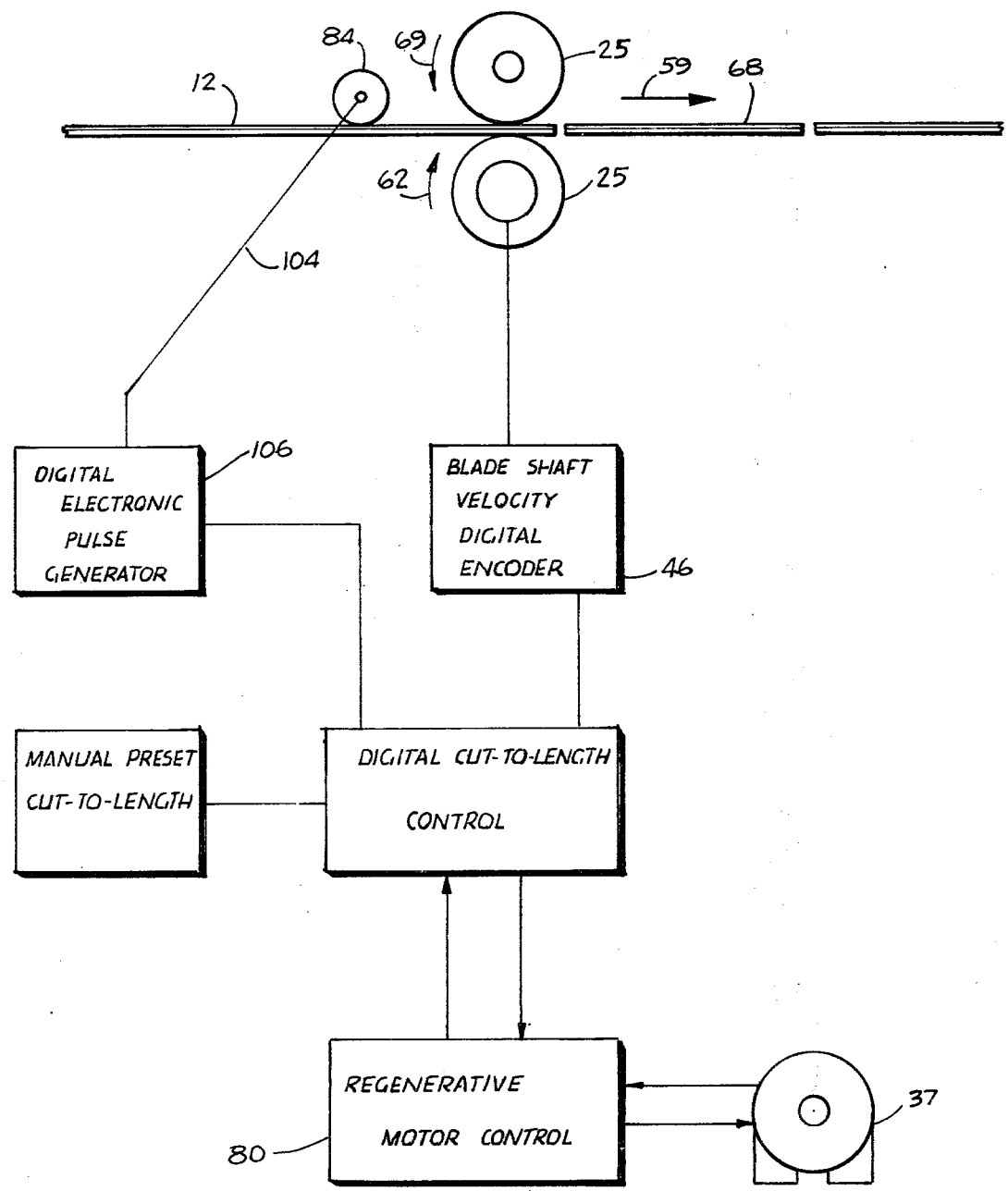
FIG. 14 is a schematic illustration of the essential components of a typical Digital Cut-to-Length Control system for a rotary shear machine.
Figure 15:
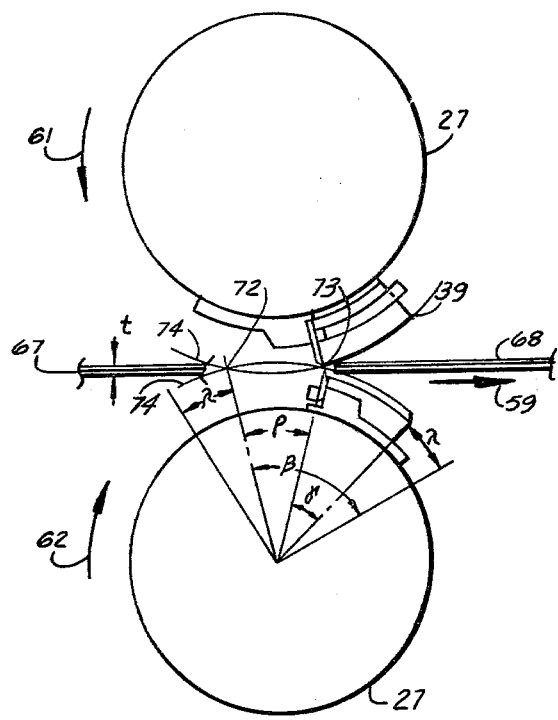
FIG. 15 is a schematic illustration of the period of cut for a rotary shear machine having helical blades.

Referring now to FIGS. 14 and 15, each helical blade cylinder 25, when inclined at the helix angle $\theta$ off square with the direction of travel 59 of the web 12, may be controlled for successively cutting sheets 68 of predetermined lengths perpendicularly from the moving web 12. Specifically, as diagrammatically shown in FIG. 13, the velocity of the moving web is sensed by the upper feed roller 84 and drives the electronic pulse generator 106 for generating digitally electronic pulses bearing a predetermined relationship to the velocity of the moving web. The rotational velocity of a shaft carrying one of the hollow cylinders 25 is also sensed by a digital encoder 46. The digital signals from the digital electronic pulse generator 106 and the shaft velocity digital encoder 46 are input into a Digital Cut-to-Length Control of a type manufactured by Dynapar Corporation, headquartered in Guerney, Illinois. The desired sheet length is manually selected and input into the Digital Cut-to-Length Control with the Manual Preset Cut-to-Length Control. The Digital Cut-to-Length Control compares the signals received from the electronic pulse generator 106 and the shaft velocity digital encoder 46 to the information received from the Manual Preset Cut-to-Length Control and accordingly regulates a regenerative DC motor control 80 which in turn controls the DC motor 37 directly driving the rotating cylinders 25 via the driving gears 36. Suitable regenerative DC motor controls are manufactured by Randtronics, Menlo Park, California, e.g. their model TB750, Regenerative DC Motor Control.

The blade shaft velocity digital encoder 46 generates 1000 pulses per revolution and is programmed with a master marker position such that it generates an independent electronic pulse signal corresponding to the end of the period of cut.

More particularly, referring to FIG. 15, the period of cut $\beta$ of the of the helical blades 39 and 41 is angularly illustrated. The angle $\gamma$ designates the degrees of arc which the cylinders 25 must rotate for complete engagement of the helical blades 39 and 41 across their entire lengths. The angle $\rho$ designates the degrees of arc through which arbitrarily small segments of the blades 39 and 41 overlap. Angle $\lambda$ designates a safety margin degrees of arc through which it is desirable to drive the blades at web velocity prior to the point 72 of initial engagement and subsequent to the point 73 where the blades no longer overlap. Blades 39 and 41 are shown at point 73 in FIG. 15. The lines 74 show the locus of the cutting edges of the blades 39 and 41 as the cylinders 25 oppositely rotate.

Since the web material 67 has a thickness "t", the helical blades 39 and 41 will initially contact the web material prior to the point 72 of initial blade contact. Accordingly, it may be desirable to include in the Manual Preset Cut-to-Length Control an adjustment for the thickness of material to be cut, for adjusting the safety margin angles $\lambda$ relative to the thickness of the material to be cut. The sum of the angles, $2\lambda + \rho + \gamma = \beta$, where $\beta$ is the angular equivalent of the period of cut. In other words, the helical blades should be rotated at the velocity of the moving web throughout angle $\beta$.

The shaft digital encoder 46 is programmed to produce signals indicative both of the rotational position and the velocity of the helical blades carried by the hollow cylinders 25 as shown in FIG. 14.

Figure 16:
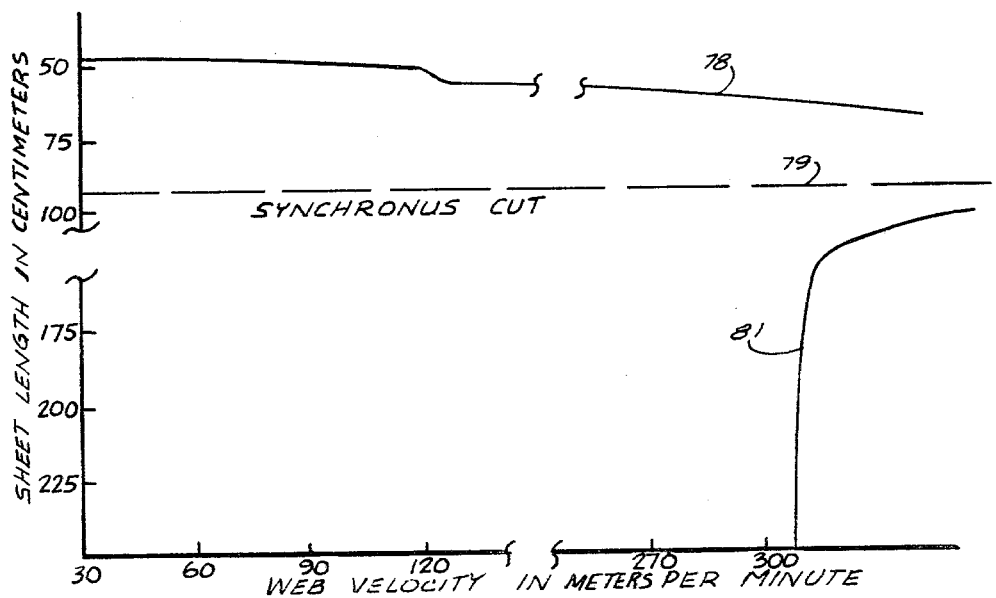
FIG. 16 is a graph illustrating the relationships between web velocity and the length of sheets which can be cut from the moving web.

In more detail, referring to the graph shown in FIG. 16 illustrating the relationships between the sheet length to be cut in centimeters and the velocity of the web in meters per minute, the curve 78 designates the shortest sheet which may be cut without driving the DC motor beyond its operational range. Line 79 designates the length of sheet which would be cut when the helical blades rotate synchronously at web velocity. The curve 81 shows the maximum web velocity above which sheets cannot be cut without driving the DC motor beyond its normal operational range. The data and information presented in the graph of FIG. 16 is presently solely for the purpose of illustration and the actual curves 78, 79 and 81 will vary depending upon the inertia of the rotating components, the radius of the cylinders and blades, and the capabilities of the particular DC electrical motor drive, as well as other factors. The area bounded by the curves 78 and 81 designates the operational range of exemplary hollow cylinders 25 carrying helical blades. In particular, the blades are rotating synchronously with web velocity, the length of sheet will approximately equal the circumference of a cylinder having the same radius as the radial distance from the axis of rotation to the cutting edges of the helical blades 39 and 41. If the sheets to be cut are shorter than synchronous length 79, then upon receiving the end of cut signal, the Digital Cut to Length Control will accelerate the helical blades to a velocity greater than web velocity and then at some point before the period of cut $\beta$, decelerate the helical blades such that reach web velocity at the beginning of the period of cut. If the length of sheets to be cut is longer than synchronous length, then upon receiving the end of cut signal, the Digital Cut-to-Length Control will decelerate rotation of the helical blades below web velocity and then at some point before the period of cut, accelerate the helical blades such that they reach web velocity at the beginning of the period of cut $\beta$. In fact, the Digital Cut-to-Length Control should be programmed such that it minimizes electrical power consumption by the DC motor drive as it accelerates and decelerates (brakes) rotation of the helical blade cylinders 25.

The Digital Cut-to-Length Control system for the invented rotary shear machine as described is for hollow cylinders 25 carrying helical blade shears. Of course, it may be possible to use a common logic control system for controlling the respective DC motor drives driving the respective helical blade cylinders 25. In fact, there may be many modifications of the particular control sequences for varying the rotational periods of the helical blades carried by the hollow cylinders 25. The principal factors which must be considered in programming such control systems are as follows:

(1) The period of cut $\beta$, i.e., the time and/or angular interval in which the helical blades must move at web velocity;

(2) The mass and inertia of the rotating components of the machine;

(3) The operational capabilities of the DC electrical motor drive driving the respective rotating components of each helical blade shear cylinder pair;

(4) The range of expected shear resistance of the materials to be cut; and (5) The expected velocity range of the moving web.

The capacity of any Digital Cut-to-Length Control to regulate rotation of the helical blade cylinders 25 for production of uniform sheets of a precise length primarily depends upon the accuracy and capability of the means used to sense web velocity. The described web feed and pull roller systems 82 and 83 comprise in combination a highly accurate web velocity sensor. Specifically, the fact that the upper web feed roller 84 or the sensing component is located proximate to the locus at which the web is severed minimizes error due to different web velocities at the sensing locus and the shear locus. Moreover, the components of the web feed and pull roller systems 82 and 83 determine the velocity at which the web moves by the shear locus. In addition, the web feed and pull roller systems 82 and 83 prevent the web from compressing or buckling as it is sheared by the helical blades. Finally, the electromagnetic clutch mechanism for coupling the upper feed roller 84 to rotation of the shaft 94 of the pivot bar prevents interruption of pulse generation in the event the upper feed roller 84 is lifted from contact with the web. Thus, there is no requirement for a reference pulse generator to maintain stability in the Digital Cut-to-Length Control. Specifically, the Digital Cut-to-Length Control can continue to regulate the DC motors driving the helical blade cylinders 25 even though the upper feed roller 84 is not in contact with the web. This feature allows debris and/or damaged sections of the web to be passed through and be severed by the described rotary shear machine by the simple expedient of lifting the upper feed and upper pull rollers from contact with the web.

In order to prevent sagging of the cut end of the web 12 guides are provided on the lower cylinders 25 of each pair of shear cylinders. Each guide 71 herein consists of complemental substantially semi-circular segments extending from the blade holding assembly 49 around the periphery of the lower cylinder 25. The radius of each guide 71 is slightly shorter than the radius of the adjacent blade, so that the cut-end of the web 12 is prevented from sagging downwardly. The outer periphery of the guide 71 lies slightly below the level of the web 12 and its peripheral surface is treated by anti-friction coating or by anti-friction finish to obviate interference with the continuous movement of the web 12.

I claim:

1. In a rotary shear machine for shearing sheets from a continuously moving web,
   including
   a rigid frame,
   a pair of shear cylinders rotatably supported on said frame,
   coacting shear blades on said cylinders,
   driving means to rotate said cylinders opposite to one another such that the opposite shear blades shear across said web moving between said cylinders,
   the improvement comprising
   means to control the rotation of said cylinders to a speed at the time of shearing equal to the velocity of the web moving between said cylinders,
   an upper feed roller and a lower feed roller having axes perpendicular to the direction of travel of said web,
   said feed rollers being in the proximity of said cylinders and upstream relatively to the direction of movement of said web,
   digital pulse generating means coupled to said upper feed roller for generating electrical pulse signals bearing a predetermined relationship to the velocity of rotation of said upper roller, said electrical signals being received and processed by said control means for the rotation of said pair of cylinders, at the time of shearing at the same circumferential velocity as the linear velocity of said web,
   drive means for rotatably driving the upstream lower feed roller responsive to an electrical current generated by an upstream component engaging said web, said drive means rotating said upstream lower feed roller at the same circumferential velocity as of said moving web whereby said upstream feed roller tensile stresses said moving web, said upper feed roller being a follower roller when in contact with said web.

2. The rotary shear machine specified in claim 1, and
   a pair of pull rollers downstream from and in proximity of said cylinders, for pulling the cut end of said web,
   means to drive the lower pull roller at the same circumferential velocity as the velocity of the movement of the web, thereby to maintain a constant tension on the portion of the web being sheared,
   said drive means for said pull roller being responsive to an electrical current generated by said upstream component to drive said lower pull roller at the same circumferential velocity as the circumferential velocity of said upstream lower feed roller to maintain constant tension on said web during the shearing action of said shearing blades.

3. The rotary shear machine specified in claim 1, and
   means for lifting and lowering said upper feed roller from and into contact with said moving web,
   said upper feed lower in the lowered position slightly compressing said web against said lower feed lower,
   means coupling said upper feed roller to said drive means for said lower feed roller when said upper feed roller is out of contact with said web, for oppositely rotating said upper feed roller relative to the rotation of said lower feed roller, whereby said upper feed roller drives said digital pulse generating means constantly when out of contact with said web and maintains the corresponding control for the velocity of rotation of said shear cylinders.

4. The rotary shear machine specified in claim 1, and
   a pair of pull rollers downstream from and in proximity of said cylinders, for pulling the cut end of said web,
   means to drive the lower pull roller at the same circumferential velocity as the velocity of the movement of the web, thereby to maintain a constant tension on the portion of the web being sheared,
   said drive means for said pull roller being responsive to an electrical current generated by said upstream component to drive said lower pull roller at the same circumferential velocity as the circumferential velocity of said upstream lower feed roller to maintain constant tension on said web during the shearing action of said shearing blades,
   means for lifting and lowering said upper feed roller from and into contact with said moving web,
   said upper feed lower in the lowered position slightly compressing said web against said lower feed lower,
   means coupling said upper feed roller to said drive means for said lower feed roller when said upper feed roller is out of contact with said web, for oppositely rotating said upper feed roller relative to the rotation of said lower feed roller, whereby said upper feed roller drives said digital pulse generating means constantly when out of contact with said web and maintains the corresponding control for the velocity of rotation of said shear cylinders.

5. The rotary shear machine specified in claim 1, wherein said control means includes
  said drive means being common to the upstream feed rollers and the downstream pull roller.

6. The rotary shear machine for shearing sheets from a continuously web as specified in claim 1,
  a plurality of pairs of shear cylinders rotatably supported on said frame in perpendicular alignment, each having coacting shear blades thereon and driving means to rotate each pair of cylinders opposite to one another such that the opposite shear blades cross another web, moving between said cylinders.

7. The rotary shear machine specified in claim 1, and
  said drive means including a reversible direct current electrical motor drive,
  and a digital electronic control system for regulating a rotational cycle of the oppositely rotating pair of parallel cylinders, including
  shaft sensor means for generating digital electrical signals bearing a predetermined relationship to both the angular position and circumferential velocity of said blades,
  end cut sensor means for generating an electrical signal pulse indicating completion of a rotational cycle of said oppositely rotating parallel cylinders,
  selecting means for manually selecting a length of sheet desired to be cut from said moving web,
  said selecting means establishing as electrical relationship bearing a predetermined relation to the selected sheet length,
  drive control means for regulating electrical power to said direct current motor drive,
  digital logic control means for regulating said drive control means responsive to digital electrical signals received from said shaft sensor means, said end cut sensor means and a web velocity sensor means in accordance with the electrical relationships established by said selecting means.

8. The rotary shear machine specified in claim 1, and
  each blade being secured longitudinally along the surface of its cylinder in a helix, one blade of each cylinder of each pair bearing angular relationship of $\theta$ to the longitudinal axis of its cylinder, the other blade bearing an angular relationship of $360° - \theta$ to the longitudinal axis of its cylinder, said blades being positioned relative to each other on the respective cylinders to mesh progressively along their entire lengths as the respective cylinders rotate oppositely shearing the web therebetween,
  the axes of rotation of said cylinders being at an angle of 90° plus the blade helix angle relative to the direction of travel of said moving web whereby said web being sheared perpendicularly to its travel.

9. The rotary shear machine specified in claim 1, and
  each blade being secured longitudinally along the surface of its cylinder in a helix, one blade of each cylinder of each pair bearing angular relationsip of $\theta$ to the longitudinal axis of its cylinder, the other blade bearing an angular relationship of $360° \theta$ to the longitudinal axis of its cylinder, said blades being positioned relative to each other on the respective cylinders to mesh progressively along their entire lengths as the respective cylinders rotate oppositely shearing the web therebetween,
  the axes of rotation of said cylinders being at an angle of 90° plus the blade helix angle relative to the direction of travel of said moving web whereby said web being sheared perpendicularly to its travel, and
  the axes of said rollers being perpendicular to the direction of travel of said web.

10.
A rotary shear machine for transversely severing a plurality of moving webs comprising in combination,
  a rigid frame structure having rigid box structures forming the sides thereof, including inner and outer bearing support plates held in spaced relation by side plates,
  a plurality of spaced parallel hollow cylinder pairs within said frame structure, one web moving between each hollow cylinder pair,
  an inner bearing for each end of each hollow cylinder each inner bearing fixed in an inner bearing support plate in axial alignment with a shaft integrally extending coaxially from the respective ends of said hollow cylinder, said shafts extending through said inner bearings,
  an outer bearing for each end of each hollow cylinder, each outer bearing fixed in an outer bearing support plate in axial alignment with said shaft integrally extending from the ends of said hollow cylinder, said shafts extending through said outer bearings and outer bearing plates, said plurality of hollow cylinder pairs being supported within said frame structure by said inner and outer bearings, said frame structure and inner and outer bearings providing coupled counterbalancing cantilever support stiffening said hollow cylinder pairs against forces tending to flex them apart,
  a backlash preventing gear transmission means for each hollow cylinder pair coupling the respective ends of said hollow cylinder pair for minimizing torsional flexure of said cylinders and torsional flexure of said frame structure, said backlash preventing gear transmission means further coupling each hollow cylinder pair for opposite rotation about their respective longitudinal axis,
  a separate reversible driving means coupled to each backlash preventing gear transmission means, each reversible drive means rotatably driving a hollow cylinder pair,
  a blade secured longitudinally along the surface of each hollow cylinder in a helix, one blade of each hollow cylinder pair bearing an angular relationship of $\theta$ to the longitudinal axis of the cylinder to which it is secured, the remaining blade of said hollow cylinder pair bearing an angular relationship of $360° - \theta$ to the longitudinal axis of the cylinder to which it is secured, said blades positioned relative to each other on the respective cylinders of each hollow cylinder pair to mesh progressively along their entire lengths as the respective pair of cylinders oppositely rotate for shearing any material therebetween, one helical blade rotationally preceding the other helical blade carried by the oppositely rotating cylinder and having a slightly greater rotational radius measured from the longitudinal axis of the cylinder to which it is secured and the other helical blade, whereby arbitrarily small sections along the lengths of the respective blade pairs only touch for shearing engagement, the axes of rotation of said plurality of hollow cylinder pairs being positioned at an angle 90° plus the blade helix angle relative to the direction of travel of said moving webs, each web being severed perpendicular to its direction of travel by the helical blades carried by the particular hollow cylinder pair, a separate control means regulating each driving means for accelerating and decelerating rotation of each hollow cylinder pair, every rotational cycle of each hollow cylinder pair including a period of cut beginning at a point where the helical blades rotate into initial engagement with the web moving between the particular hollow cylinder pair and ending at a point where said helical blades rotate out of engagement with said web, each control means regulating each driving means such that the helical blades of each hollow cylinder pair move at the velocity equal to that of the particular web moving therebetween during said period of cut, a feed roller system for each hollow cylinder pair comprising in combination, an upstream feed roller system including, an upper and a lower feed roller having parallel longitudinal rotational axes aligned perpendicular to the direction of travel of said web moving between said upper and lower feed rollers, means for lifting and lowering said upper feed roller from and into contact with said moving web, said upper feed roller in the lowered position slightly compressing said web against said lower feed roller, means coupling said upper feed rollers to said lower feed roller when said upper feed roller is out of contact with said web of moving material for oppositely rotating said upper feed roller relative to the rotation of said lower feed roller, a digital pulse generating means coupled to said upper feed roller for generating electrical pulse signals bearing a predetermined relationship to the velocity of rotation of said upper roller, said electrical signals being received and processed by said control means for the particular hollow cylinder pair, a downstream feed roller system including, an upper and a lower feed roller having parallel longitudinal rotational axes aligned perpendicular to the direction of travel of said web moving between said upper and lower feed rollers, means for lifting and lowering said upper feed roller from and onto contact with said moving web, said upper feed roller in the lowered position, slightly compressing said web against said lower feed roller, means coupling said upper feed roller to said lower feed roller for oppositely rotating said upper feed roller relative to the direction of rotation of said lower feed roller, a common drive follower means for rotatably driving the upstream and the downstream lower feed rollers for each hollow cylinder pair responsive to an electrical current generated by an upstream component engaging and driving a common web prior to its being severed into a plurality of separate moving webs, said drive follower means rotating said upstream and downstream lower feed rollers at the same circumferential velocity as the linear velocity of said common web of moving material whereby each upstream feed roller system tensilely stresses said web moving therebetween upstream from the particular hollow cylinder pair, said downstream feed roller system imparting the same linear velocity to a blank severed from one of said continuous webs by the helical blades carried by a particular hollow cylinder pair as the linear velocity of said continuous web of material from which said blank was severed downstream from the particular hollow cylinder pair.

11. In a digital electronic control system for regulating a rotational cycle of oppositely rotating parallel cylinders each cylinder carrying a longitudinal blade positioned on said cylinder to mesh in shearing engagement for shearing a web moving between said oppositely rotating parallel cylinders, including a reversible direct current electrical motor drive for rotatably driving said oppositely rotating parallel cylinders, shaft sensor means for generating digital electrical signals bearing a predetermined relationship to both the angular position and velocity of said blades, end cut sensor means for generating an electrical signal pulse indicating completion of a rotational cycle of said oppositely rotating parallel cylinders, selecting means for manually selecting a length of sheet material desired to be cut from said moving web, said selecting means establishing an electrical relationship bearing a predetermined relation to a selected sheet length, drive control means for regulating electrical power to said reversible DC electrical motor drive, digital logic control means for regulating said drive control means responsive to digital electrical signals received from said shaft sensor means, said end cut sensor means and a web velocity sensor means in accordance with the electrical relationships established by said selecting means, web velocity sensor means for generating digital electrical signals bearing a predetermined relationship to velocity of said moving web comprising in combination therewith, an upper and a lower feed roller having parallel longitudinal rotational axes perpendicular to the direction of travel of said web moving between said upper and lower feed rollers, said upper and lower feed rollers being located upstream from and proximate to said oppositely rotating cylinders, means for lifting and lowering said upper feed roller from and into contact with said moving web, said upper feed roller slightly compressing said web against said lower feed roller in the lowered position, drive follower means for rotatably driving said lower feed roller responsive to an electrical current generated by an upstream component engaging and driving said web, said drive follower means rotatably driving said lower feed roller at the same circumferential velocity as the linear velocity of said web of moving material for tensilely stressing said web of moving material, a digital pulse generating means coupled to said upper feed roller for generating electrical pulses bearing a predetermined relationship to velocity of rotation of said upper feed roller, said electrical signals being received by said digital logic control means, means coupling said upper feed roller to said lower feed roller for oppositely rotating said upper feed roller relative to the direction of said lower feed roller when said upper feed roller is out of contact with said web of moving material whereby digital signals are continuously generated by the digital pulse generator permitting continued operation of the oppositely rotating parallel cylinders carrying the blades for shearing material by said digital control system.

12. The rotary shear machine specified in claim 1, and circumferential web guiding means on the lower cylinder of said pair of cylinders.

13. The rotary shear machine specified in claim 12, and
a pair of pull rollers downstream from and in proximity of said cylinders, for pulling the cut end of said web,
means to drive the lower pull roller at the same circumferential velocity as the velocity of the movement of the web, thereby to maintain a constant tension on the portion of the web being sheared,
said guide means being circumferential rings longitudinally spaced along said lower cylinder.

14. The rotary shear machine specified in claim 12 or 13 and the periphery of said circumferential web guides being antifrictional.

* * * * *